Feb. 14, 1933.  G. A. MITCHELL ET AL  1,897,494
METHOD OF MAKING COMPOSITE PICTURES
Filed Jan. 17, 1927  2 Sheets-Sheet 1

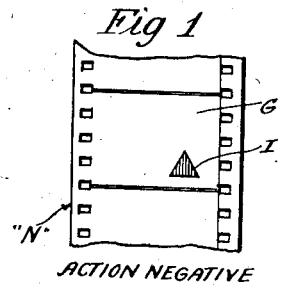
Fig 1. "N" ACTION NEGATIVE

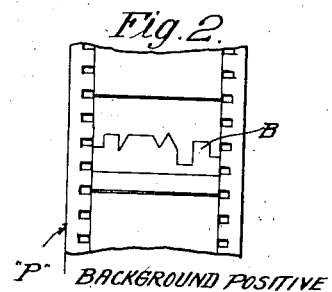
Fig.2. "P" BACKGROUND POSITIVE

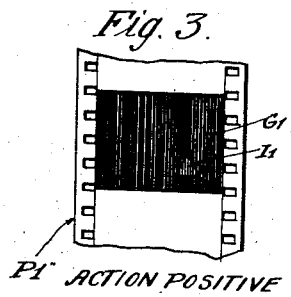
Fig. 3. "P1" ACTION POSITIVE

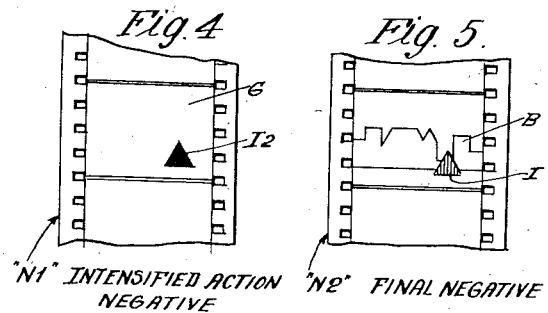
Fig.4. "N1" INTENSIFIED ACTION NEGATIVE
Fig. 5. "N2" FINAL NEGATIVE

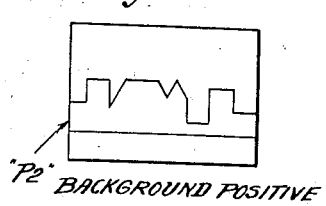
Fig. 6. "P2" BACKGROUND POSITIVE

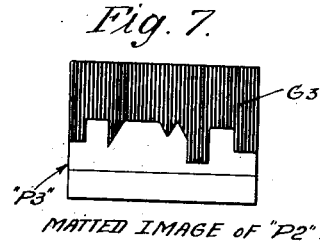
Fig. 7. "P3" MATTED IMAGE of "P2"

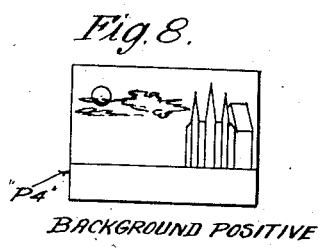
Fig. 8. "P4" BACKGROUND POSITIVE

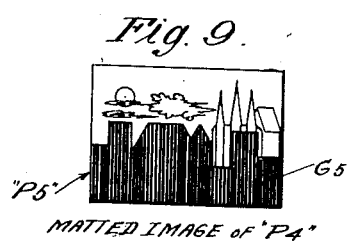
Fig. 9. "P5" MATTED IMAGE of "P4"

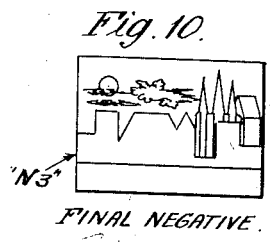
Fig. 10. "N3" FINAL NEGATIVE

Inventors.
George A Mitchell
Friend F Baker

Attorney.

Feb. 14, 1933.  G. A. MITCHELL ET AL  1,897,494
METHOD OF MAKING COMPOSITE PICTURES
Filed Jan. 17, 1927  2 Sheets-Sheet 2
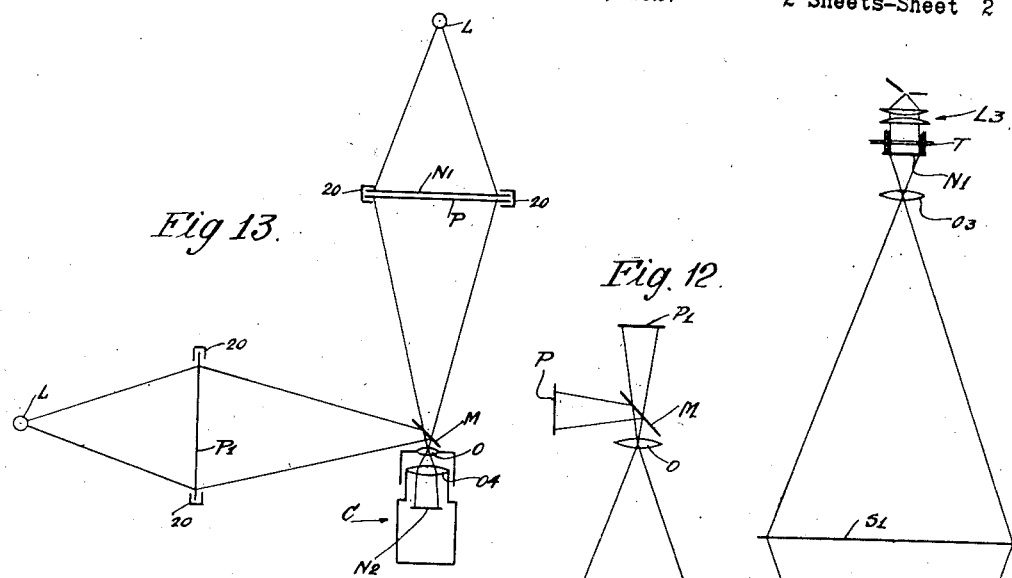
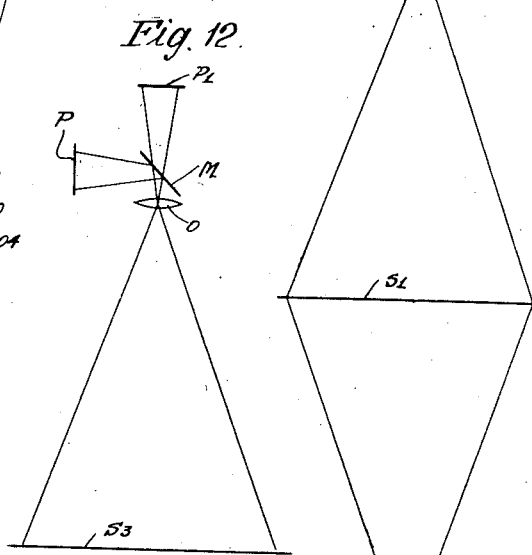
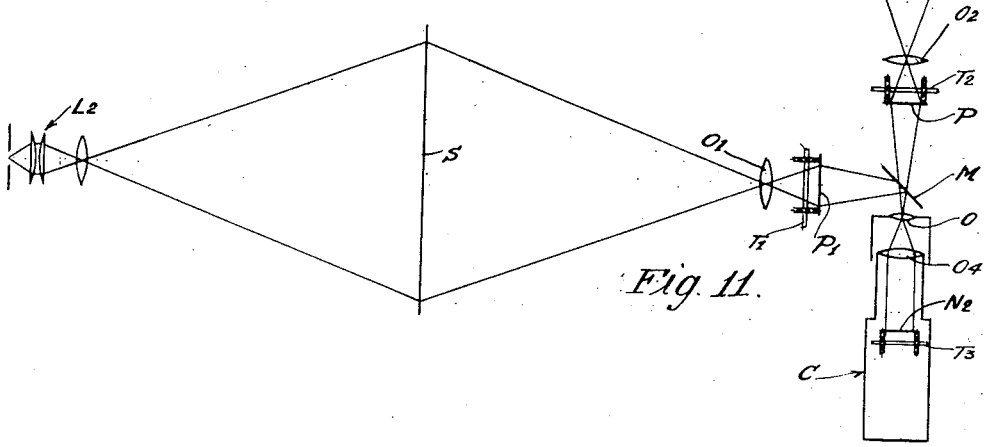
Inventor.
George A. Mitchell
Friend F. Baker,
Attorney.

Patented Feb. 14, 1933

1,897,494

UNITED STATES PATENT OFFICE

GEORGE A. MITCHELL, OF HUNTINGTON PARK, AND FRIEND F. BAKER, OF SAWTELLE, CALIFORNIA, ASSIGNORS, BY DIRECT AND MESNE ASSIGNMENTS, TO MITCHELL CAMERA CORPORATION, A CORPORATION OF DELAWARE

METHOD OF MAKING COMPOSITE PICTURES

Application filed January 17, 1927. Serial No. 161,639.

This invention has reference to the making of photographic composite pictures such, for instance, as are widely used in the motion picture industry. And although, as will readily be seen after consideration of the following description, the invention is not at all limited to the making of composite motion pictures, it will be described more particularly in that aspect. And although the invention is not limited to composing a photographic action image with a photographic background image, it will be described more particularly, in some of its more specific aspects, as applied to such composition, although it will be broadly described as a method of composing any two photographic images.

The objects of the invention will be best understood when considered in parallelism with its corresponding accomplishments which are explained hereinafter; but it may be preliminarily stated as a general object of the invention, to provide a method whereby two or more previously existing images may be very accurately composed in any desired arrangement, and, furthermore, in any desired proportional sizes. And it is a particular object not only to obtain great accuracy, but also simplicity of operation and to reduce to a minimum the number of operations necessary, and particularly the number of printing or exposing operations. A method commonly used in the past has involved two successive exposures or printings upon the final composite negative or positive. Among other accomplishments, the present invention obtains its results with only a single operation of printing upon or exposure of the final negative or positive.

In accordance with the present invention either a final composite negative or positive may be obtained; but because for many purposes it is desirable to obtain a final composite, negative, the following specific description of a preferred and illustrative form of the invention will describe it as producing the final composite negative; for the purpose of such description I refer to the accompanying drawings, in which:

Fig. 1 is a diagrammatic representation of what may be termed an original action negative;

Fig. 2 is a similar view of an original background positive;

Fig. 3 is a view of an action positive;

Fig. 4 shows what may be termed an "intensified" action negative;

Fig. 5 shows the final composite negative;

Fig. 6 shows a background positive;

Fig. 7 shows how that positive or an image of it appears when matted for composition with the positive of Fig. 8;

Fig. 8 shows another background positive desired to be composed with that of Fig. 6;

Fig. 9 shows the appearance of the background positive of Fig. 8, or its image, when matted;

Fig. 10 shows the final negative composed from the positives of Figs. 6 and 8;

Fig. 11 is a diagram illustrating an optical system used in the present method;

Fig. 12 is a diagram illustrating parts of the optical system in use for obtaining accurate registration of the component images; and Fig. 13 is a diagram illustrating a simple form of optical system for carrying out the present method.

The shading on the several figures indicates relative opacity, not color.

The obtainance of such positives and negatives as shown in Figs. 3 and 4, or of such matted positives, or matted positive images, as shown in Figs. 7 and 9, is a matter commonly known to the art. It is in the use of these positives and negatives that the present invention differs from the prior art; and consequently it is immaterial by what particular method they may be obtained. However a usual and suitable method may be described.

In Fig. 1 is shown, for instance, an action negative N that has been taken of the action before a black or non-actinic ground, the negative thus showing the action image I in a clear ground G. The positive P of Fig. 3 printed from negative N will thus show the positive action image $I^1$ in a substantially opaque ground $G^1$.

Fig. 2 shows, for instance, positive P of a background scene, with which the action is desired to be combined. This positive may be obtained in any time, place and manner.

Fig. 4 shows what we will term an intensified action negative $N^1$, which shows an opaque silhouette image $I^2$ of the action in a clear ground G. This intensified action negative may be obtained in any suitable manner, as for instance, by intensifying the original action negative, or intensifying a negative made from positive $P^1$, or by applying an opaque pigment by hand to either such negative. It is usually preferable, however, not to intensify or opaque the original action negative, as it is usually desirable to preserve that negative. The methods first to be described are applied to the composition of such an action and background as shown in Figs. 3 and 2; or, more broadly, a composition of any two photographic images, one of which has been so taken that an opaque ground positive and a silhouette negative may be produced therefrom in any manner. (Throughout this description it will be remembered that the relative terms "positive" and "negative" are not limitations upon the invention.)

Fig. 13 shows in diagram a simple form of apparatus whereby the two images may be composed upon a single final negative $N^2$. Partially reflecting mirror M, or any "light composing" device is used before the photographic lens O. This "light composing" device is simply a "light splitting" device used in a reverse manner, as will be well understood. Positive $P^1$ is placed in such a position as to be in the field of view of the lens, for instance, by reflection from mirror M. Positive P is placed so as to be in the field view of the lens through mirror M. Intensified action negative $N^1$ is placed in proper registry with background positive P, and, in this simple arrangement, may be placed in contact with the positive. In this position the silhouette image $I^2$ on negative $N^1$ masks a corresponding area of background positive P from illumination by light L. Consequently, the image of positive P cast by lens O onto the negative $N^2$ will be an image of only those parts of the background positive that are not masked by the silhouette image $I^2$. Action positive $P^1$ is so arranged and adjusted with relation to mirror M, that its action image $I^1$ will be cast by lens "O" upon the negative $N^2$ in exact register with the silhouette in the image of the background. And positive $P^1$, being opaque in all parts, except its image $I^1$, does not, through lens O, illuminate any part of negative $N^2$ except the parts corresponding to the action image. Consequently, in a single exposure of negative $N^2$, it takes both the action image and the surrounding parts of the background image, without either of the images overlapping. The final result is such a negative as is shown at $N^2$ in Fig. 5, showing the action image I, just as if the original action had taken place in or before the background B.

Now, although our invention so far has been explained particularly with reference to what is termed an "action" and its composition with a "background", it will readily be seen that the method, even as only so far explained, is not limited to the composition of such two specific things. The image here described as an action image may of course be of any object or scene; while the image here described as a background image may be either still or moving. Thus, in motion-picture photography, either both the original photographs may be of still objects or scenes, or one may contain moving objects or persons, or both may be of things in motion. For the purpose of the method as so far explained, it is only necessary that the original photographs shall have been so taken that a positive and negative of one of them may be obtained with complementary opaque parts.

It will be understood of course that in applying the method of Fig. 13 to motion pictures, positive $P^1$ and negative $N^1$, if they involve motion, will be moved step by step for each exposure taken by the camera C, negative $N^2$ being also moved step by step; and that if positive P involves motion, it will likewise be moved step by step for each exposure made by camera C.

In the optical system of Fig. 13, the films or other image carrying elements, $P^1$, P and $N^1$, may be supported in focal planes by any suitable means, as by the ways indicated diagrammatically at 20. And, although we represent $P^1$, P and $N^1$, as being larger than $N^2$ (as if $P^1$, P and $N^1$ were photographs of ordinary size and $N^2$ were a motion picture film) it will be understood that the relative sizes may be as desired, the focal distances, and the relative placements of $P^1$, P and $N^1$ being varied accordingly.

Fig. 11 illustrates a more extended optical system whereby further and varied results of composition may be obtained, and greater accuracy of registration effected; and photographic pictures be composed even if it is not practicable to obtain, from one of these pictures, the positive and negative with complementary opaque portions.

In this figure the same camera C is shown with its photographic lens O and the final negative $N^2$. The mirror M is the same as before, and positive $P^1$ is shown in the same position relative to the mirror, as in Fig. 13. The background positive P may also be placed in the same relative position, as in Fig. 13, but not necessarily so; it may be removed and the plane which it occupied at P becomes the plane of a real image, as will be hereinafter described. Outside of positive $P^1$ is a lens $O^1$. Outside the position or plane of P is another lens $O^2$, and these two lenses may be duplicates. Outside of lens $O^1$ is a light transmissive surface S, which may be in the nature of any suitable translucency; and a light projector $L^2$ illuminates surface S. Another surface $S^1$ bears a similar relation to lens $O^2$; and a projector $L^3$ illuminates surface $S^1$; but projector $L^3$ carries the negative $N^1$, or its equivalent, and the projection lens $O^3$ of this projector, projects an image of $N^1$ onto surface $S^1$, preferably in a fair degree of enlargement. Lens $O^2$ projects the image from $S^1$ to P, and the image at P is picked up by the photographic lens O through the mirror M and thrown upon final negative $N^2$.

In the method of making such a composite picture as is shown in Fig. 5, the essential operations in the optical system of Fig. 11 are substantially the same as in Fig. 13. If $P^1$ is placed in the position shown in Fig. 11, the function of the optical system outside of $P^1$ is merely to illuminate that positive. If positive P is placed in the position shown in Fig. 11, the function of the optical system outside P is to throw an image of negative $N^1$ onto the positive P; with essentially the same result as if $N^1$ were placed against P, as in Fig. 13. The surface at $S^1$ may be a translucent surface to actually show an enlarged image of $N^1$; it may be transparent or it may be removed entirely, the plane at $S^1$ being then merely the focal plane of the enlarged real image of $N^1$.

As explained in connection with Fig. 13, all or any of the positive and negative films that concern motion may be moved synchronously, step by step, means for supporting and moving the films being shown at T, $T^1$ and $T^2$. It will be recognized, however, that the particular procedures so far described are not limited to the use of photographs or films, any or all of which concern motion. All of the photographs P, $P^1$ and $N^1$ may be still pictures.

In any case where background positive P does not involve motion, that positive may be enlarged and may be placed at $S^1$ as a transparency. It is for this purpose and for further similar purposes, hereinafter to be described, that the surface at $S^1$ is primarily provided. The same is true of positive $P^1$ and surface S. When the positive is placed as shown at P in Fig. 11, no real surface at $S^1$ is in fact necessary, as the image of $N^1$, at the plane of $S^1$, is a real image.

With an enlarged positive P placed at the surface $S^1$ as a transparency, it will be seen that the optical results are the same as in the former cases, a real image then being formed at position P. This placement of the background positive, however, has the advantage of making that positive large and thus facilitates accurate registration of the image of $N^1$ on it. The surface at $S^1$ also facilitates the use of a hand-painted or otherwise prepared background to take the place of a photographic background. Thus, for instance, any photographed action or other object or scenery may be combined with a fanciful object or scene. And, furthermore, by using both the surfaces S and $S^1$ to take either enlarged photographs or paintings, or the like, any desired representations of objects or scenes may be composed with great facility. Suppose, for instance, that we have two positives $P^2$ and $P^4$, as shown in Figs. 6 and 8, and it is desired to compose them. Preferably these positives, if they are small, will first be enlarged and will then be prepared with complementary opaque parts $G^3$ and $G^5$, as shown in Figs. 7 and 9. This can be very accurately done in the large size. Then one of these positives is placed in the plane of S and the other in the plane of $S^1$; and the result on the final negative, when exposed and developed, will appear as shown at $N^3$ in Fig. 10.

While we refer to $P^2$ and $P^4$ as being photographic positives, it of course may be readily seen that they may be any kind of transparent picture. Or they may even be any kind of opaque picture, in which case they will be illuminated on their fronts by reflection rather than from their backs by transmission. When two such pictures are placed at S and $S^1$, the projector at $L^3$ (with no picture at $N^1$), becomes in effect a mere illuminator of the picture at $S^1$. And, as has been indicated before, although it is preferable to place such pictures, enlarged, at S and $S^1$, that is not necessary as such pictures may be placed, one at $P^1$, and the other either at P or at $N^1$. And, wherever these pictures are placed, it will be seen that the blocking out of complementary parts may be done very accurately at surfaces S and $S^1$. For instance, one positive $P^3$ may be placed in the position of $N^1$ and projected onto $S^1$ and a mask then very accurately painted or otherwise constructed at $S^1$. The same thing may be done as regards positive $P^5$ and the surface S. Then exposure may be made with the positives in positions like that of P, or in positions like that of $N^1$ in Fig. 11.

The procedures so far described involve the composition of two pictures, both of which may be still pictures, or one or both of which may involve action. However, it requires only a repetition of the procedure to combine any number of pictures. For instance, after two pictures have been combined on a negative $N^2$ or $N^3$, the composite picture thus obtained may again be combined with another; and so on, indefinitely.

Apparatus suitable for all the described procedures will be readily understood from the foregoing description. With the full apparatus as diagrammed in Fig. 11 any of the variant methods may be worked. In practice projector $L^3$ may be any standard projector with an intermittent movement for the film, as indicated at T. Projector $L^2$ need only be an ordinary light projector without an intermittent movement; although $L^2$ may be a duplicate of $L^3$ and any film placed at P may just as well be placed in the projector at $L^2$. The projectors and also surfaces S and $S^1$ may be suitably mounted to be moved to and from the camera and the various lenses will be provided with the usual focusing adjustments. All the parts will be relatively laterally adjustable across the optical axes to obtain registration adjustment. Intermittent movements for motion picture films at P and $P^1$ will be provided at $T^1$ and $T^2$; and the motion picture camera C will have its intermittent movement $T^3$.

In any of the methods described it will be seen that the relative image sizes in the component parts of the finished picture may be controlled and varied by changing certain relative distances in the optical system. For instance, if the action or other image of N—1 is desired to be relatively enlarged, that can be done by adjusting lens O—3 to throw a larger image of N—1 on the surface or plane S—1; or S—1 and N—1 may be moved up closer to O—2. The lens O—2 will in either case cast a larger image of N—1 onto positive P or into the focal plane at P. And the same things may be done as regards a picture at S. Consequently it is not necessary in my procedure that the original pictures be of such relative size as to be composable in their original sizes.

To facilitate very accurate registration of the two components on the final negative, it is preferred to provide a camera C having not only an objective lens O but also a supplemental lens O—4. Objective O will preferably be a lens of comparatively long focal length. By removing lens O—4 and the rearward parts of the camera the enlarged images cast by lens O may be taken upon a surface S—3 (see Fig. 12); and by observation of the enlarged images on this surface the necessary adjustments of the various original pictures and the parts of the optical system may be made to obtain accurate registration, placement, and the desired relative sizes of the component images. When once this is done and lens O—4 replaced, the shorter resultant focal length of lenses O and O—3 throws the small sized image on the final negative.

From a consideration of the several procedures that have now been described, it will be seen that the system involves broadly a single exposure of a single final actinic surface simultaneously to the two pictures which have the component parts desired to be composed in the final single picture; complementary parts of each picture (the part not wanted in the final pictures) being blocked out as by masking, matting or opaqueing, either on the picture itself or on an image of the picture. In composing such pictures as shown in Figs. 6 to 10 it has been shown that such blocking out may be done by masking the original picture, either small or enlarged; or if such a picture is placed for instance at either N—1 or P, the blocking out may be accomplished by matting or opaqueing on the surface S—1. And likewise the picture P—1 may be blocked out by suitable operations in surface S. In any case, it will be seen that the blocking out, by whatever particular means it may be accomplished, amounts simply to the exclusion of light from the predetermined complementary portions of the two pictures or of their images which are finally cast upon the final film. And in the method which has been explained for the composition of such pictures as shown in Figs. 1 to 5, this blocking out is substantially the same. The silhouette negative N—1 is merely a convenient means of blocking off the light from a certain portion of the image of P; and the positive P—1 is likewise a convenient means of blocking off light from the complementary part of the image of that positive. In motion picture work, where action is involved, it is most convenient to use the complementary films P—1 and N—1, and to obtain them photographically in the specific manner before described; but it will be understood that these two complementary opaque films may be obtained in any suitable manner. They may even be prepared by hand; or the successive frames of a motion picture may be even treated much as a still picture, the composition being carried on in any of the manners hereinbefore explained particularly with regard to still pictures.

We claim:

1. The method of producing a composite photograph, that includes forming two images of one component with complementary opaque parts, and thus forming complementary silhouettes of said component, projecting an image of one of said silhouettes in enlarged size upon an image-receiving surface, projecting and forming an image of said surface, together with an image of the other component, to form a real image at a given focal plane before a light composing device, placing a real image of the other complementary silhouette in another focal plane before said light composing device, and casting a real image from both the images in both said focal planes, through the light composing device onto a fresh actinic surface.

2. Apparatus such as described, for making composite pictures, embodying a camera, a light composing element before the lens of the camera adapted to take the light along two different axes and, in cooperation with the camera lens, adapted to throw upon the focal plane of the camera images from two focal planes outside the light composing element, means for maintaining at one of said exterior focal planes a real image of one component, an image receiving surface outside the other said focal plane adapted to receive an enlarged real image of the other component, and a lens between said surface and said last mentioned focal plane adapted to cast a real image from said surface to said focal plane.

In witness that we claim the foregoing we have hereunto subscribed our names this 6th day of January 1926.

GEORGE A. MITCHELL.
FRIEND F. BAKER.